(12) United States Patent
Corbin

(10) Patent No.: US 7,066,025 B1
(45) Date of Patent: Jun. 27, 2006

(54) METHOD FOR BALANCING A DRIVE SHAFT

(75) Inventor: Robert R. Corbin, Farmington Hills, MI (US)

(73) Assignee: Raven Engineering, Inc., Oxford, MI (US)

( * ) Notice: Subject to any disclaimer, the term of this patent is extended or adjusted under 35 U.S.C. 154(b) by 0 days.

(21) Appl. No.: 10/739,365

(22) Filed: Dec. 18, 2003

Related U.S. Application Data

(60) Provisional application No. 60/434,724, filed on Dec. 18, 2002.

(51) Int. Cl.
*G01M 1/16* (2006.01)
*G01M 1/22* (2006.01)

(52) U.S. Cl. .......................................... 73/462; 73/468
(58) Field of Classification Search ................... 73/462, 73/460, 468, 469, 66
See application file for complete search history.

(56) References Cited

U.S. PATENT DOCUMENTS

| | | | |
|---|---|---|---|
| 4,112,774 A | 9/1978 | Chadwick | |
| 4,700,439 A | 10/1987 | Hines | |
| 4,759,217 A * | 7/1988 | Brihier et al. ................. | 73/462 |
| 4,930,348 A | 6/1990 | Bandhopadhyay et al. | |
| 5,214,585 A | 5/1993 | Ehrich | |
| 5,576,496 A | 11/1996 | Carlini et al. | |
| 5,627,762 A | 5/1997 | Cameron et al. | |
| 5,760,302 A | 6/1998 | Moradi et al. | |
| 5,992,232 A | 11/1999 | Saitoh | |
| 6,032,551 A | 3/2000 | Welsh et al. | |
| 6,122,957 A * | 9/2000 | Bux et al. ...................... | 73/66 |
| 6,281,466 B1 | 8/2001 | VanOtteren et al. | |
| 6,506,998 B1 | 1/2003 | VanOtteren et al. | |
| 6,539,852 B1 | 4/2003 | Ertl | |
| 6,595,053 B1 * | 7/2003 | Parker .......................... | 73/462 |
| 6,694,812 B1 * | 2/2004 | Loetzner et al. .............. | 73/462 |

* cited by examiner

Primary Examiner—Helen Kwok
(74) Attorney, Agent, or Firm—Young & Basile, P.C.

(57) ABSTRACT

A method for automatically balancing a drive shaft about a rotational axis. The method includes providing an unbalanced drive shaft for rotation about a rotational axis to determine an out-of-balance condition with respect to the drive shaft. A plurality of standardized weights or counterweights are provided wherein each standardized weight has a substantially equivalent mass. The method determines an optimal position for placing at least one of the standardized weights on a drive shaft to correct the out-of-balance condition. Standardized weights are then attached to the outer circumference of the drive shaft at the optimal position. The effectiveness of the added standardized weights is verified by subsequently rotating the drive shaft to determine whether an out-of-balance condition still exists. If the out-of-balance condition still exits, additional standardized weights may then be added to the circumference of the drive shaft.

20 Claims, 2 Drawing Sheets

METHOD FOR BALANCING A DRIVE SHAFT

This is a formalization of U.S. Provisional Patent Application Ser. No. 60/434,724 filed Dec. 18, 2002.

FIELD OF THE INVENTION

The present invention relates to balancing drive shafts, and more particularly, a method of balancing a drive shaft under computer control by attaching standardized weights of a common mass to an outer surface of the drive shaft.

BACKGROUND OF THE INVENTION

Motor vehicle drive trains generally include a substantially tubular drive shaft and one or more axles driven through a differential mechanism. Collectively, this drive chain is driven by a prime mover, such as an engine, through a transmission. Drive shafts, sometimes referred to as propeller shafts, are remarkably simple mechanically but are a vital element of the drive train. It has long been recognized that balancing of the drive shaft is a key element in improving the overall performance of the drive train. A well-balanced drive shaft results in a motor vehicle which is smoother and quieter. In addition, reducing or removing excessive vibration in the drive shaft contributes to increased component life of the remaining components in both the drive shaft and motor vehicle.

A wide variety of methodologies have been developed for the automated testing and balancing of tubular drive shaft elements. Modern computers, by virtue of their low cost and versatility, have become commonplace components in the process of drive shaft balancing. Utilizing testing equipment which is capable of determining the precise angular position of a drive shaft in relation to a test fixture, it is possible to analyze the vibrational signature of a drive shaft with exquisite precision. The information generated by such computers can then be fed back to an operator or automated machine to assist in the precise location of counterweights in relation to the drive shaft, thereby minimizing its tendency to vibrate over a wide range of speeds and operating conditions.

The existing methodologies all generally involve placement of a drive shaft or similar rotating element in a fixture similar to an ordinary lathe. The drive shaft is suspended from spindles on opposing ends of the machine, and rotated rapidly on the spindles utilizing well known power means. Sensors associated with the spindles determine an out-of-balance condition and provide a computer display or printout of the angular position on the shaft corresponding to an imbalance. Modern computers in this application are also programmed to identify the amount of counterweight required in order to bring the shaft into balance. In other words, both the position of the imbalance and the mass and location of the necessary counterweight are provided by the associated computer.

In the current state of the art, individual weights of varying sizes and masses are attached to the shaft by projection welding. Such weights have small "feet" or projections which facilitate the attachment of the weight to the outer surface of the shaft. The weights themselves are generally small rectangular elements having a curvature which matches or approximates the curvature of the outer circumference of the shaft. In the current state of the art, an operator either manually positions or instructs a robotic element to position the necessary weight on the propeller or drive shaft in an appropriate position in relation to the out-of-balance position. The required weights are then secured to the propeller shaft by an automated welding device. This process may require the positioning of one or more weights of varying sizes in different angular positions on the circumference of the shaft. Once the welding operations are completed, the shaft is again tested to verify that the weight positioning is correct.

In the current state of the art, the task is work-intensive, requiring the operator to frequently stop and start the balancer, determine the proper location for the weights, locate suitable size and mass of weight, manually position the weights on the shaft, operate the welding apparatus for securing the weights to the shaft and then verify the positioning. Numerous efforts have been made over the years to automate this process. However, one of the principal impediments to automation has been the necessity to select from an inventory of several dozen different sizes and masses of balancing weights.

One unsuccessful effort has been made to utilize a continuous strip of metal ribbon as a source for automated fabrication of the necessary weights. In this method, a coil of steel is mounted to a spool and positioned adjacent to the balancing apparatus. When the balancing apparatus has determined the necessary position and mass for the weight, under computer control, an appropriate segment of the coil of steel is cut and fed to the balancing apparatus for robotic placement on the propeller shaft and subsequent welding. This method has been discarded inasmuch as it requires the storage, movement and manipulation of a coil of steel, which tends to be inordinately heavy and bulky. The process of cutting the required segment of steel with precision has also been fraught with difficulties. For these and other reasons, the "cut on site" methodology has not been widely accepted in the industry.

It would be desirable to provide an automated method for balancing a drive shaft.

SUMMARY OF THE INVENTION

The present invention relates to a method of automatically balancing a drive shaft. The present invention includes the steps of rotating an unbalanced drive shaft about a rotational axis to determine whether an out-of-balance condition exists with respect to the drive shaft. A plurality of standardized weights each having a substantially equivalent mass are provided for balancing the drive shaft. The optimal position for placing at least one of the standardized weights on the drive shaft is determined for correcting the out-of-balance condition. The standardized weights are attached to the drive shaft at the optimal positions by an attachment method, such as welding. After the standardized weights have been attached to the drive shaft, the drive shaft may be rotated to determine the effectiveness of the added weights and to determine whether an out-of-balance condition still exists. If an out-of-balance condition still exists, additional standardized weights may be attached to the drive shaft. The standardized weights may be automatically delivered adjacent a welder for welding the standardized weights to the drive shaft.

DETAILED DESCRIPTION OF THE DRAWINGS

DETAILED DESCRIPTION OF THE PREFERRED EMBODIMENT

Figure 1:
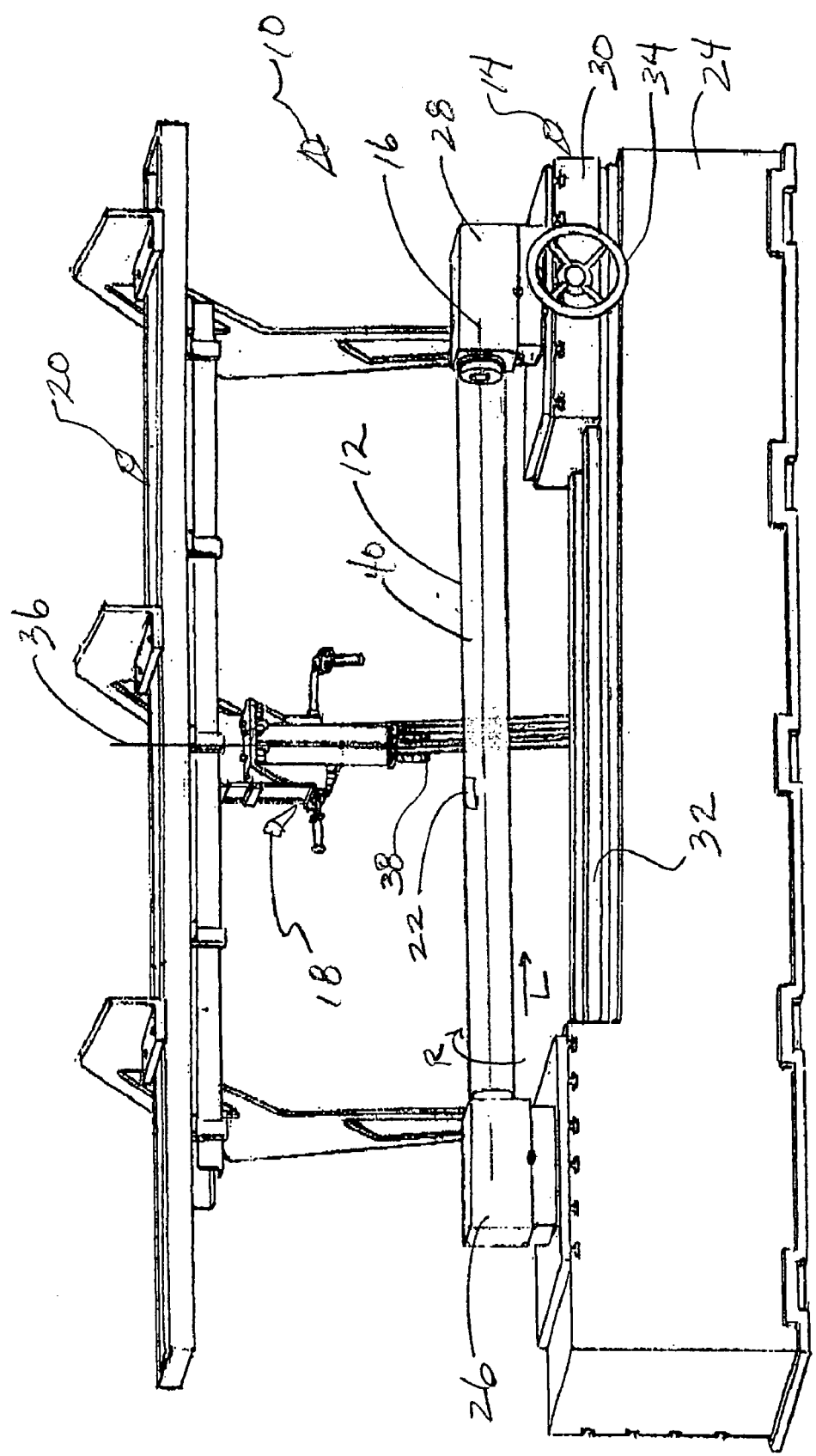
FIG. 1 is a perspective view of an apparatus for performing the method of automatically balancing a drive shaft as described in the present invention.

Referring to the drawings, the present invention will now be described in detail with reference to the disclosed embodiments.

FIG. 1 illustrates an apparatus 10 for performing the method of automatically balancing a substantially cylindrical drive shaft 12, as described by the present invention. The apparatus 10 provides a traditional shaft-balancing machine 14 for rotating the drive shaft 12 about a rotational axis 16. The shaft-balancing machine 14 has the ability to rotate the drive shaft 12 about the rotational axis 16 to determine whether an out-of-balance condition exists with respect to the drive shaft 12. The shaft-balancing machine 14 also has the ability to determine where counterweights may be attached to the drive shaft 12 to place the drive shaft 12 in a balanced condition. A welding machine 18, such as a projection welder, is supported by an overhead conveyor or slide 20 for movement substantially parallel to the rotational axis 16 of the drive shaft 12. The welding machine 18 communicates with the shaft-balancing machine 14 in order that the welding machine 18 may automatically weld standardized weights or counterweights 22 to the drive shaft 12 to place the drive shaft 12 in a balanced condition. It should be noted that although the present invention is ideally suited for balancing drive shafts, the present invention contemplates that the method described herein may also be utilized on other substantially cylindrical shafts that require balancing, such as propeller shafts.

To determine whether the drive shaft 12 is in an out-of-balance condition, the shaft-balancing machine 14 provides a solid base 24 properly secured to a foundation (not shown). The base 24 of the shaft-balancing machine 14 has a pair of spindles 26, 28 mounted thereon. One spindle 26 is mounted in a fixed position relative to the base 24, and the other spindle 28 is mounted on a pallet 30 which is slidably connected to a slide 32. The pallet 30 has a lever 34 for securing the pallet 30 to a fixed position on the slide 32. By loosening the lever 34, the pallet 30 may be moved longitudinally along the slide 32 to a predetermined position. Although the present invention discloses only one of the spindles 26, 28 as being selectively positionable in relation to the base 24, it is contemplated that both or neither spindles 26, 28 may be selectively positionable.

With respect to rotating the drive shaft 12, either or both of the spindles 26, 28 may utilize a drive (not shown) to spin and rotate the drive shaft 12 about the rotational axis 16 at a predetermined speed. Sensors (not shown) coupled to the drive sense the forces imposed on the spindles 26, 28 as the drive shaft 12 rotates between spindles 26, 28. The sensors signal such forces through appropriate electronic interfaces to a digital computer (not shown) which is programmed to evaluate the forces and the angular position of the spindles 26, 28 to determine the out-of-balance condition of the drive shaft 12 dynamically. After the drive shaft 12 has been spun at its test speed, the computer samples the data referenced above, reports the out-of-balance condition to an operator, and maintains data regarding the out-of-balance condition in computer memory. Since the drive shaft 12 is temporarily fixed to the spindles 26, 28 during the testing process, angular rotation of the drive shaft 12 corresponds to angular rotation of the spindles 26, 28, and therefore, angular rotation of the spindles 26, 28 can be automatically or manually initiated to position the drive shaft 12 at any desired angular position so that the position of the out-of-balance condition on the circumference of the drive shaft 12 is easily located and duplicated for the processes that follow.

Once the drive shaft 12 out-of-balance condition has been determined, as described above, the drive shaft 12 is rotated to its welding position. The welding machine 18 is mounted to the overhead conveyor or slide 20 so as to provide movement of the welding machine 18 along the rotational axis 16 of the drive shaft 12. The overhead conveyor or slide 20 may be connected and supported by the base 24 of the welding machine 18, or the overhead conveyor or slide 20 may be independently supported. The welding machine 18 may be manually moved along a longitudinal axis of the overhead conveyor or slide 20 or automatically moved along the longitudinal axis of the overhead conveyor or slide 20 by a computer-controlled drive (not shown). The welding machine 18 may also be moveably adjusted along an axis 36 substantially perpendicular to the rotational axis 16 of the drive shaft 12. When moving along axis 36, the welding machine 18 moves between a non-welding position, wherein the welding machine 18 is withdrawn and spaced from the outer surface 40 of the drive shaft 12, and a welding position, wherein the welding machine 18 provides a welding tip 38 that is positioned adjacent an outer surface 40 of the drive shaft 12. The movement of the welding machine 18 along the axis 36 may also be controlled manually or automatically wherein a computer controlled drive (not shown) provides the automatic movement of the welding machine 18 along axis 36.

To automate the method described in the present invention, the standardized weights or counterweights 22 each have a substantially equivalent mass. This eliminates the need for an operator or computer to select the proper amount of counterweight to be attached to the drive shaft 12. The standardized weights 22 also allow for automatic delivery to the welding tip 38 since the delivery system need not be concerned with the categorization and selection of various size counterweights.

The present invention contemplates that the standardized weights 22 are automatically delivered to the welding machine 18 through the use of a conventional bowl or nut feeder (not shown). The bowl or nut feeder provides a funnel (not shown) which provides the individual distribution of the standardized weights 22 adjacent the welding tip 38 of the welding machine 18. The bowl or nut feeder allows standardized weights 22 to be poured into the bowl portion of the bowl or nut feeder wherein the standardized weights 22 are individually aligned for individual disbursement to the welding tip 38.

The positioning of the standardized weights 22 for welding to the drive shaft 12 may be accomplished either manually, semi-automatically, or automatically, including the use of a dedicated robot (not shown). In one of the embodiments, the mounting position of the standardized weight 22 is required to secure the standardized weight 22 to the circumference of the drive shaft 12, as computed by the computer in response to the predetermined out-of-balance condition explained above. Likewise, the computer is programmed to recognize that only a single standardized weight 22 is available for use as a counterweight. For example, the computer may be told that the standard weight available for use is a weight having a dimension of 2.5 cm per side and a mass of 10 g. With this standard data available to the computer program, the computer program then determines the number and location of standardized weights 22 which should be placed along the rotational axis 16 of the drive shaft 12 to effect an ideal balance. This may, for example, result in the placement of a single standardized weight 22 at an angular position R in relation to an angular datum preestablished for the drive shaft 12, and at a longitudinal position L along the length of the drive shaft 12 as measured from an end datum. This placement of a first standardized weight 22 may be followed by the placement of a second weight at angular position R' and longitudinal position L'. This process may be repeated for numerous weights along the longitudinal axis of the drive shaft 12. Once the standardized weights 22 have been positioned by either an operator or an automated device, the welding machine 18 is moved into position to weld the standardized weight 22 to the outer surface 40 of the drive shaft 12 through a typical welding operation.

Following the welding operation as above-described, the spindles 26, 28 are once again rotated at a predetermined speed, and a validation of the placement of the standardized weights 22 is conducted to determine whether the drive shaft 12 is still out-of-balance. If necessary, additional standardized weights 22 may be added using the process described above following validation. This process may be continued for several steps until such time as an ideal balancing has been obtained.

Throughout the process, the position of the drive shaft 12 and the condition of the balancing operation may be monitored utilizing the computer described above. Because an overhead welding machine 18, such as a projection welder, is used, rather than the traditional "C" type welder, the present invention is particularly adapted to be retrofitted to existing balancing machines, since the overhead welding machine 18 will not interfere with the safety guards generally found in traditional spin-balancing stations.

Figure 2:
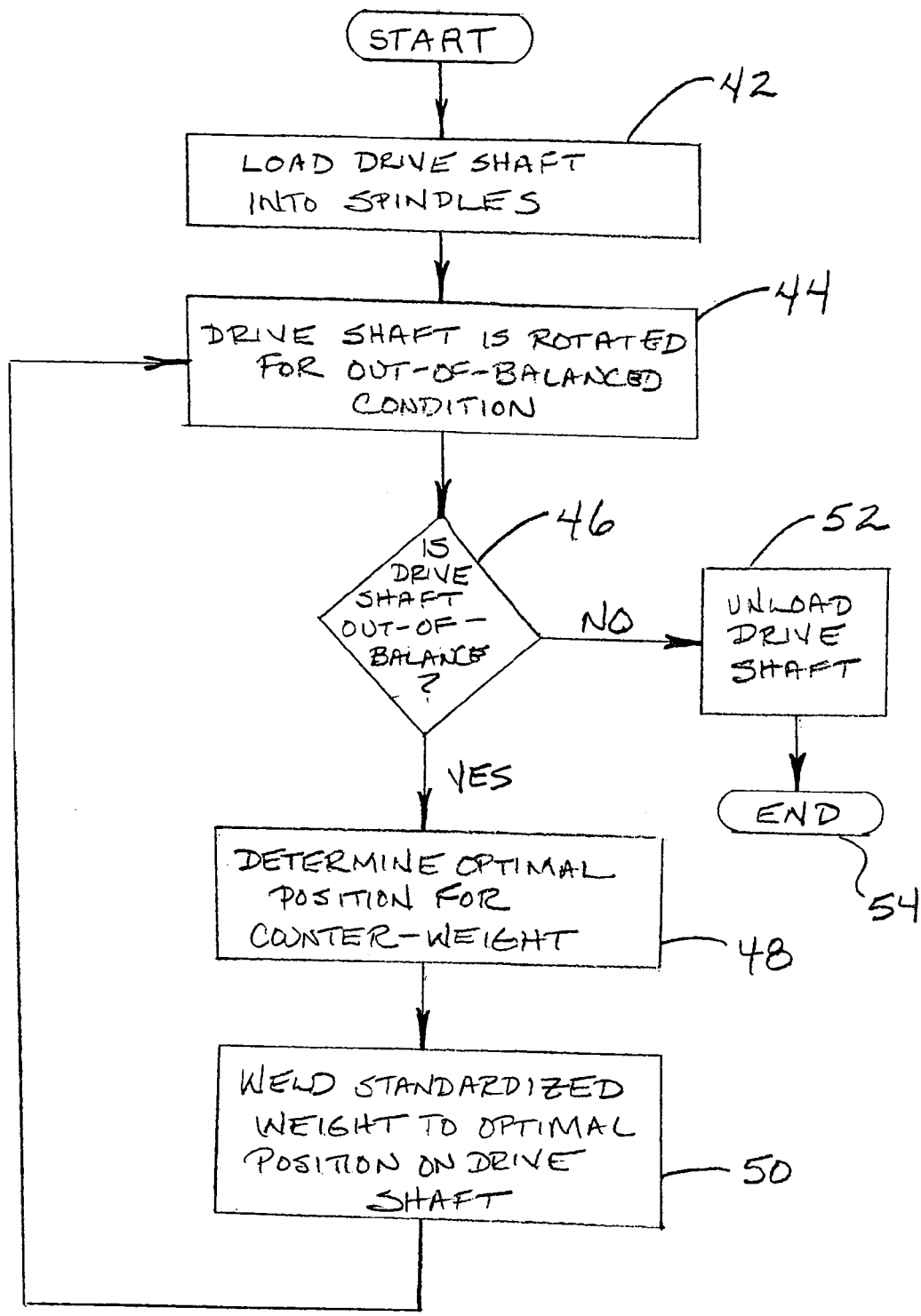
FIG. 2 is a flow chart describing the method of automatically balancing a drive shaft of the present invention.

In operation, the method of the present invention may proceed as described in FIG. 2. The method starts by loading the drive shaft 12 into spindles 26, 28, as seen in box 42. The drive shaft 12 is rotated by the spindles 26, 28 to determine whether or not an out-of-balance condition exists, as shown in box 44. The sensors in the spindles 26, 28 send signals to the computer which determine whether an out-of-balance condition exists, as seen in triangle 46. If an out-of-balance condition exists, the computer determines an optimal position on the outer surface 40 of the drive shaft 12 whereby the standardized weights 22 may be attached thereon, as seen in box 48. The welding machine 18 is moved into the proper position to weld the standardized weight 22 to the drive shaft 12, as noted in box 50. The effectiveness of the added standardized weights 22 to the drive shaft 12 is verified by rotating the drive shaft 12 again to determine whether or not an out-of-balance condition exists, as seen in block 44. If the computer determines that an out-of-balance condition of the drive shaft 12 does not exist, then the drive shaft 12 is unloaded from the spindles 26, 28, as noted by block 52, and the process ends, as shown in block 54.

While the invention has been described in connection with what is presently considered to be the most practical and preferred embodiment, it is to be understood that the invention is not to be limited to the disclosed embodiments, but to the contrary, it is intended to cover various modifications or equivalent arrangements included within the spirit and scope of the appended claims. The scope is to be accorded the broadest interpretation so as to encompass all such modifications and equivalent structures as is permitted under the law.

What is claimed is:

1. A method for balancing a drive shaft about a rotational axis comprising the steps of:
   providing an unbalanced drive shaft for rotation about said rotational axis;
   rotating said drive shaft to determine an out-of-balance condition;
   providing a plurality of standardized weights each having a substantially equivalent mass;
   determining an optimal position for placing at least one of said standardized weights on said drive shaft to correct said out-of-balance condition; and
   attaching said standardized weights to said drive shaft at said optimal position.

2. The method as stated in claim 1, wherein attaching said standardized weights further comprises the steps of:
   welding said weights to said drive shaft with a single tip projection welder.

3. The method as stated in claim 1, further comprising the steps of:
   verifying the effectiveness of said standardized weights when added to said drive shaft by rotating said drive shaft to determine whether an out-of-balance condition exists.

4. The method as stated in claim 3, further comprising the steps of:
   attaching additional weights to said drive shaft.

5. The method as stated in claim 4, further comprising the steps of:
   automatically delivering said standardized weights adjacent a projection welder.

6. A method for balancing a drive shaft about a rotational axis, comprising the steps of:
   providing a substantially cylindrical, unbalanced drive shaft for rotation about said rotational axis;
   rotating said drive shaft about said rotational axis to determine an out-of-balance condition of said drive shaft;
   providing a plurality of standardized weights each having a substantially equivalent mass;
   determining an optimal position for placing at least one of said standardized weights on an outside surface of said drive shaft to correct said out-of-balance condition;
   attaching said at least one standardized weight to said outside surface of said drive shaft at said optimal position; and
   verifying the effectiveness of standardized added weights when added to said drive shaft by rotating said drive shaft to determine whether an out-of-balance condition exists.

7. The method stated in claim 6, wherein said at least one standardized weight further comprises the steps of:
   welding said at least one standardized weight to said outside surface of said drive shaft.

8. The method stated in claim 7, further comprising the steps of:
   providing an overhead, single tip projection welder for welding said standardized weights to said outside surface of said drive shaft.

9. The method stated in claim 8, further comprising the steps of:
   automatically delivering said standardized weights adjacent to said projection welder.

10. The method stated in claim 6, further comprising the steps of:
    attaching additional weights to said drive shaft to correct said out-of-balance condition.

11. The method stated in claim 10, further comprising the steps of:

spacing said additional weights circumferentially about said drive shaft.

12. The method stated in claim 11, further comprising the steps of:

axially spacing said additional weights.

13. The method stated in claim 8, further comprising the steps of:

moving said projection welder along a path of travel substantially perpendicular to said rotational axis wherein said projection welder moves between a non-welding position, wherein said projection welder is spaced from said drive shaft, and a welding position, wherein said projection welder is immediately adjacent said drive shaft.

14. A method for balancing a drive shaft about a rotational axis, comprising the steps of:

providing a substantially cylindrical, unbalanced drive shaft for rotation about said rotational axis;

rotating said drive shaft about said rotational axis to determine an out-of-balance condition of said drive shaft;

providing a plurality of standardized weights each having a substantially equivalent mass;

determining an optimal position for placing at least one of said standardized weights, on an outside surface of said drive shaft to correct said out-of-balance condition;

welding said at least one standardized weight to said outside surface of said drive shaft at said optimal position;

verifying the effectiveness of said at least one standardized weight when connected to said drive shaft by rotating said drive shaft to determine whether or not an out-of-balance condition exists; and welding additional weights to said outside surface of said drive shaft when said drive shaft remains in an out-of-balance condition after welding said at least one standardized weight to said outside surface of said drive shaft.

15. The method stated in claim 14, further comprising the steps of:

providing an overhead, single tip projection welder for welding said at least one standardized weight to said outside surface of said drive shaft.

16. The method stated in claim 15, further comprising the steps of:

providing a bowl feeder for automatically delivering said standardized weights adjacent to said projection welder.

17. The method stated in claim 15, further comprising the steps of:

reciprocally moving said projection welder along a path of travel substantially perpendicular to said rotational axis wherein said projection welder moves between a non-welding position wherein said welder is radially spaced from said drive shaft, and a welding position, wherein said welder is immediately adjacent said outer surface of said drive shaft.

18. The method stated in claim 15, further comprising the steps of:

moving said projection welder along a longitudinal axis of said drive shaft.

19. The method stated in claim 14, further comprising the steps of:

spacing said additional weights circumferentially about said drive shaft.

20. The method stated in claim 14, further comprising the steps of:

spacing said additional weights axially from said additional weights.

* * * * *